US006954611B2

(12) United States Patent
Hashimoto et al.

(10) Patent No.: US 6,954,611 B2
(45) Date of Patent: Oct. 11, 2005

(54) METHOD OF AND APPARATUS FOR GENERATION/PRESENTATION OF PROGRAM-RELATED CONTENTS

(75) Inventors: Takako Hashimoto, Tokyo (JP); Atsushi Iizawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 394 days.

(21) Appl. No.: 10/194,220

(22) Filed: Jul. 15, 2002

(65) Prior Publication Data

US 2003/0027592 A1 Feb. 6, 2003

(30) Foreign Application Priority Data

Jul. 16, 2001 (JP) ........................................ 2001-216039

(51) Int. Cl.[7] .............................................. H04H 1/00
(52) U.S. Cl. ................... 455/3.01; 455/414.4; 455/418; 455/566; 709/201
(58) Field of Search ............................ 455/556.2, 3.01, 455/3.06, 3.02, 3.03, 3.04, 412.1, 414.4, 414.2, 418, 419, 566; 725/38, 40; 709/200, 201

(56) References Cited

U.S. PATENT DOCUMENTS

2002/0178447 A1 * 11/2002 Plotnick et al. ............... 725/36
2003/0120555 A1 * 6/2003 Kitagawa ...................... 705/26
2003/0121040 A1 * 6/2003 Ferman et al. ................ 725/40

OTHER PUBLICATIONS

Hiroyuki Kondo, et al., "Restructuring and Presentation of Results by a Search Engine in Mobile Environment", Jul. 27, 2000, pp. 199–206 (with English abstract).
Kazutoshi Sumiya, et al., "Web Skimming: A Dynamic Summarizing and Browsing Method for Web Documents", 2000, pp. 1–8 (with English abstract).
Qiang Ma, et al., "Information Filtering Based on Time–Series Features for Data Dissemination Systems", vol. 37, No. 6, Jun. 1996, pp. 1–13 (with English abstract).
Takako Hashimoto, et al., "Personalized Digest of Sports Programs using Intuitive Retrieval and Semantic Analysis", Oct. 9–12, 2000 (2 pages).
Takako Hashimoto, et al. "A Rule–Based Scheme to Make Personal Digests from Video Program Meta Data", DEXA 2001, LNCS 2113, Sep. 3–7, 2001, pp. 243–253.
Yukari Shirota, et al., "A TV Program Generation System Using Digest of Video Scenes and a Scripting Markup Language", IEEE Computer Society, Jan. 3–6, 2001, pp. 4043–4050.
Yukari Shirota, et al., "Event Driven Methods for Making Program Related Information in Data Broadcasting", Dec. 6–8, 2000, pp. 97–104 (with English abstract).
Takako Hashimoto, et al. "Prototype of Digest Viewing System for Television", vol. 41, No. SIG 3 (TOD6), May 2000, pp. 71–84 (with English abstract).
Takako Hashimoto, et al., "A TV Program Generation System by Digest Video Scenes and a New Markup Language", vol. 42, No. SIG 1 (TOD6), Jan. 2001, pp. 117–130 (with English abstract).

* cited by examiner

Primary Examiner—Nay Maung
Assistant Examiner—John J. Lee
(74) Attorney, Agent, or Firm—Oblon, Spivak, McClelland, Maier & Neustadt, P.C.

(57) ABSTRACT

A program video and program-related information are input, and program-related contents are generated based on a tree structure defined in advance. Based on a preset viewing data quantity as a viewing request from each user who has a portable terminal, leaf nodes in the tree structure of the program-related contents are selected as presentation candidates for each user. A presentation route that follows the leaf nodes of the presentation candidates starting from the root of the tree structure is generated as a presentation scenario for each user. The generated presentation scenario is transmitted to the portable terminal of the corresponding user.

8 Claims, 10 Drawing Sheets

TREE STRUCTURE

ELEMENT TREE

METHOD OF AND APPARATUS FOR GENERATION/PRESENTATION OF PROGRAM-RELATED CONTENTS

BACKGROUND OF THE INVENTION

1) Field of the Invention

The present invention relates to a method of and an apparatus for generation/presentation of program-related contents that generate program-related contents to be distributed to a portable terminal from a program video and program-related information that is relevant to this program video along the progress of a program, under a mobile environment of receiving a text, a still picture, and a motion picture by utilizing a portable terminal such as a portable telephone and a PDA. More specifically, this invention relates to a method of and an apparatus for generation/ presentation of program-related contents that generate and present program-related contents, by efficiently presenting a large quantity of information during a short period of time with a simple operation, even when a portable terminal having a small display area and with low manipulability is used.

2) Description of the Related Art

In recent years, there has been a rapid progress in the distribution of portable terminals including portable telephones. According to a next-generation portable terminal (IMT 2000) that is currently being operated on a trial basis, this portable terminal can receive motion pictures as well as texts and still pictures by using a network band of a maximum 384 Kbps. It has been considered it possible to install a high-level function of voice reading onto this portable terminal.

As a system using such portable terminals, there has been a service of generating and transmitting program-related contents such as a quick report on a baseball or soccer game. Following the occurrence of an event such as a scoring, or an inning end, a service provider prepares a character string like "The bottom of the first inning, Giant 3-1 Hiroshima, Giant came from behind with Y. Takahashi's timely hit", and transmits this mail to user's portable terminals. Based on this service, a user who cannot watch television during moving can know the progress of the program. At present, a character string is a main form of information transmitted by this service. It is expected that, in the near future, more sophisticated form of information will be transmitted such as motion pictures, data of an existing database, and a page of a relevant Web site.

For example, a baseball program is considered to have various kinds of program-related information such as occurrence events of a hit, an HR (homerun), scores, SBO (a strike, a ball, an out), a safe base status, a player's profile, cumulative number of turns at bat, a digest scene, a page of a relevant Web site, etc. These pieces of information are related to each other, and it is possible to express a structure of this relationship as shown in FIG. 10. A quick report on the game that shows this tree structure corresponds to the program-related contents. All nodes after a start of the game (for example, an occurrence event, a digest, a relevant Web) correspond to the program-related information.

Presentation of the above information to portable terminals has following problems. That is, (1) As a portable terminal has a small display area, presentable information is limited.

(2) When a portable terminal is used, a user can carry out only a minimum interaction. Therefore, it is difficult to view around the information structure.

(3) A function that can present as much information as possible during a short period of time is necessary.

(4) When a level of information becomes higher, information that is different for each user becomes necessary.

As a measure to solve the above problems (1) and (2), a passive viewing of programmed program-related information (a generation of program-related contents) is considered. For example, when a user views the scenes as shown in FIG. 10 on a portable terminal, it is considered more suitable to passively view scenes as programmed scenes of information than to actively view the scenes. This is because the portable terminal has a small display area, and a user's interaction is limited. If a user is to actively view the scenes in a high-level structure as shown in FIG. 10, the user must continue viewing on the small screen of the portable terminal for a long time, and must repeat the button manipulation frequently. This is painful for the user.

As a measure to solve the above problems (3) and (4), it is necessary to provide a function that can prepare contents effectively and efficiently to enable each user to sequentially view desired scenes of information in a desired order within a short period of time such as one minute or three minutes. It is said that, in general, not more than three minutes is suitable for a user to watch data on the portable terminal. This is because as the form of information becomes more sophisticated, more personalized information becomes necessary. Particularly, there is an extremely large difference in the preference of a sport program between users. Therefore, each user wants information different from what the other users want.

For example, assume that the player Takahashi of Giant hit HR in a game between Giant and Hiroshima. For the users who like Takahashi, information relating to Takahashi is important, and they want to have information relating to Takahashi such as "cumulative number of turns at bat", "record in this season", "relevant Web information", etc.

On the other hand, for Hiroshima fan users, the information on Takahashi is not necessarily important. Therefore, for these users, more information about "pitch status" of Hiroshima pitchers, "digest" up to the current time, and the team's "relevant Web information" are effective, instead of the information on Takahashi. In order to present these pieces of information as a short-time program (program-related contents) of one minute to three minutes on the portable terminals, it is necessary to automatically extract information that is important for each user, and efficiently and sequentially present the information in the order each user wants. In other words, in order to program program-related information and generate program-related contents for the portable terminals, it is necessary to provide a function that reflects individual users' preferences, and automatically generates a short-time program containing various contents.

There are relevant conventional techniques as follows.

1) "Kondo", Hiroyuki Kondo, Akiyo Nadamoto, Katsumi Tanaka, A Restructuring and Presentation of an Output Result of a Search Engine in a Mobile Environment, Summer Database Workshop 2000 (DBWS 2000), pp. 199–206 (2000).

2) "Sumiya", Kazutoshi Sumiya, Nobuhiro Ikega, Kuniaki Uehara, A Reading Support according to Dynamic Abstract of WebSkimming WWW Page Group, The Eleventh Data Engineering Workshop (DEWS' 00) Preparatory Draft CD-ROM (2000).

3) "Uma", Tsuyoshi Uma, Kazutoshi Sumiya, Katsumi Tanaka, An Information Filtering that takes into account Time Series for a Broadcasting type Information Distribution System, Information Processing Academy Paper Database (TOD7) Vol. 41, No. SIG6, pp. 46–57 (2000).

4) "Hashi 00", T. Hashimoto, Y. Shirota, A. Iizawa, and H. S. Kunii, Personalized Digests of Sports Programs using Intuitive Retrieval and Semantic Analysis, Proc. of ER200 19th International Conference on Conceptual Modeling, October 9–12, Salt Lake City, USA (2000).

5) "Hashi 01", T. Hashimoto, Y. Shirota, A. Iizawa, and H. Kitagawa, A Rule-based Scheme to make Personal Digests from Video Program Meta Data, Proc. of Dexa2001, September 3–7, Munich, Germany (2001)(to appear).

6) "Shiro", Y. Shirota, A. Iizawa, and H. Kitagawa, A TV Program Generation System Using a Digest of Video Scenes and a Scripting Markup Language, Proc. of HICCS2001 Hawaii International Conference on System Sciences, January 3–6, Hawaii, USA (2001).

7) "Shirota", Yukari Shirota, Takako Hashimoto, Atsushi Iizawa, An Event Drive type Data Broadcasting Program-Related Information Preparation System, DBWeb 2000, pp. 97–104 (December, 2000).

8) "Hashimoto 00", Takako Hashimoto, Yukari Shirota, Hiroko Mano, Atsushi Iizawa, A Digest Viewing System in TV Receiving Terminal, Information Processing Academy Paper, Database (TOD6) Vol. 41, No. SIG3, pp. 71–84 (2000).

9) "Hashimoto01", Takako Hashimoto, Yukari Shirota, Akiyo Nadamoto, Taeko Hattori, Atsushi Iizawa, Katsumi Tanaka, Kazutoshi Sumiya, A TV Program Generation System based on Digest Video Scenes and Markup Language, Information Processing Academy Paper, Database (TOD8) Vol.42, No. SIG1, pp. 117–130 (2001).

In "Kondo", Kondo and others considered that a passive viewing type presentation system is more suitable than an active type presentation on a portable terminal that has a small display area and has a small opportunity of interaction. Therefore, they proposed a WebCarrousel system that presents a search result on the Web in the Carrousel system as a programmed component. This system is effective for a user to passively views a large quantity of information obtained based on a searching of the Web, on the portable terminal. However, this system does not reflect users' preferences in presenting the information, and does not take into account a programming according to a link circulation when there is a strong relationship between the information like the program-related contents.

In "Sumiya", Sumiya and others proposed a method of presenting information in a stream, by detecting a master page common to each page from a result of searching the Web, and providing a series of flow to the searched result. This system places importance on the determination of a presentation order based on a relationship that common master pages are the same. However, this system does not take into account a determination of a presentation order and a scenario generation that reflect users' preferences.

In "Uma", Uma and others proposed a system of presenting information by calculating a degree of freshness of Web information and a scoop level, and filtering the information based on these values. However, this system does not take users' preferences into account either.

On the other hand, the applicants of the present invention have so far proposed systems that present high-level and structured program-related contents. These systems place an emphasis on how to restructure and present program-related contents according to users' preferences and characteristics of information.

For example, the applicants of the present invention have so far proposed a "personalized digest preparation system" according to individual users' preferences by utilizing metadata of television programs like baseball and soccer, in "Hashi 00", "Hashi 01", and "Hashimoto 00". This system extracts scenes having an organized meaning from basic and objective program metadata, calculates levels of importance of occurred events by reflecting users' preference information, and prepares a digest by selecting scenes in the order of high importance levels.

In "Shiro" and "Hashimoto 01", the applicants of the present invention have proposed a "program generation system using digest scenes" that automatically generates a program for each user, from digest scenes generated by the above personalized digest preparation system. This system has devised a program definition language called ppml (Personalized Program Markup Language). Based on this, the system describes components of virtual characters and program metaphors to generate a program, and stores the components into a database as an operation template. The system automatically generates a program by selecting an operation template that is optimum for each digest scene. A program that is finally output is also described in the ppml. This system can control different elements of videos and character strings, and realize a flexible generation of a program.

In "Shirota", the applicants of the present invention considered that, in order to put a data broadcasting service into practical use in a digital broadcasting, it is necessary to automatically generate data that is relevant to a program. Therefore, the applicants proposed "A Program-Related Contents Preparation System for Data Broadcasting" that dynamically generates program-related contents from program metadata.

However, according to the above conventional techniques, it has not been possible to provide a system that satisfies all the above requirements (1) to (4) that become the problems when the portable terminal receives program-related contents.

In other words, according to the above conventional techniques, in a method of and an apparatus for generation/presentation of program-related contents that generates program-related contents to be distributed to a portable terminal from a program video and program-related information that is relevant to this program video along the progress of a program, under a mobile environment of receiving a text, a still picture, and a motion picture by utilizing a portable terminal such as a portable telephone and a PDA, there has not been provided a method or an apparatus that enables users to passively view information personalized for each user without a complex interaction in a limited display area of each portable terminal and that enables each user to view desired information in a desired order.

SUMMARY OF THE INVENTION

It is an object of the present invention to provide a method of and an apparatus for generation/presentation of program-related contents that enable users to passively view information personalized for each user without a complex interaction in a limited display area of each portable terminal and that enable each user to view desired information in a desired order.

According to the present invention, a program video and program-related information are input, and program-related contents are generated based on a tree structure defined in advance. Based on a preset viewing data quantity as a viewing request from each user who has a portable terminal, leaf nodes in the tree structure of the program-related contents are selected as presentation candidates for each user. A presentation route that follows the leaf nodes of the presentation candidates starting from the root of the tree structure is generated as a presentation scenario for each user. The generated presentation scenario is transmitted to the portable terminal of the corresponding user.

These and other objects, features and advantages of the present invention are specifically set forth in or will become apparent from the following detailed descriptions of the invention when read in conjunction with the accompanying drawings.

DETAILED DESCRIPTIONS

Figure 1:
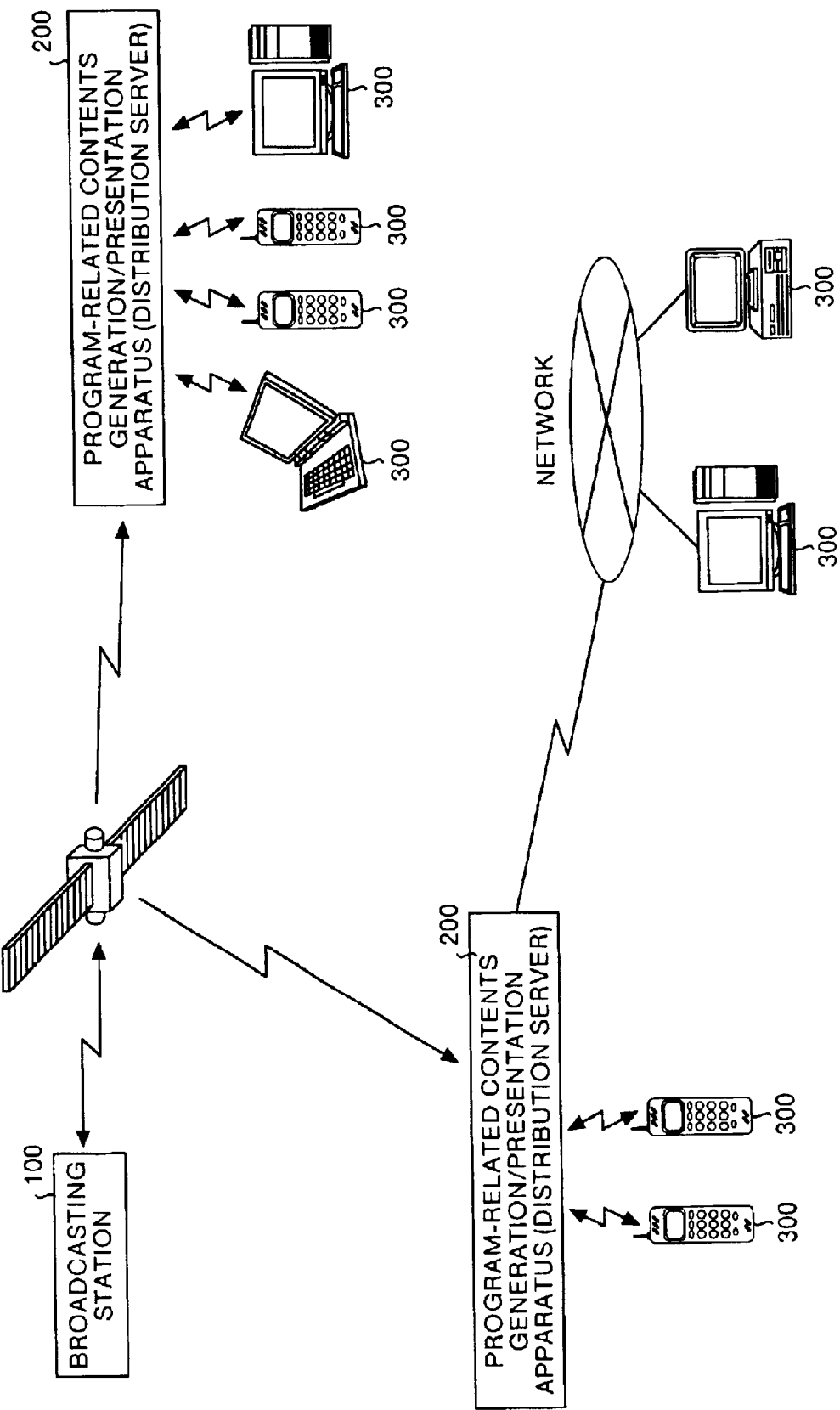
FIG. 1 is an explanatory diagram which shows a schematic structure of a program-related contents distribution system according to an embodiment of the present invention.

Embodiment(s) of a program-related contents distribution system to which the method of and the apparatus for generation/presentation of program-related contents of the present invention are applied will be explained in detail below with reference to the attached drawings. The explanation will be made in the following order. That is,
1) Outline of the invention
2) Schematic structure of a program-related contents distribution system according to the present embodiment
3) Outline of a program-related contents transmission service
4) Program-related contents presentation scenario generation processing
5) Program-related contents structure definition processing
6) Program-related contents transmission decision processing
7) Program-related contents generation processing
8) Presentation yardstick calculation processing
9) Presentation candidate selection processing
10) Element tree presentation yardstick setting processing
11) Presentation scenario generation processing
12) Program-related contents generation/presentation apparatus.

1) Outline of the Invention,

The method of and the apparatus for generation/presentation of program-related contents of the present invention utilize the techniques of the personalized digest preparation system, the program generation system using digest scenes, and the program-related contents preparation system for data broadcasting that have been already proposed by the applicants of the present invention (that is, the techniques disclosed in the literatures of "Hashi 00", "Hashi 01", "Shiro", "Shirota", "Hashimoto 00", and "Hashimoto 01" that have been explained in the description of the related art). However, based on only these techniques, it is not possible to automatically generate personalized contents for users to passively view program-related contents that change following the progress of a program on users' portable terminals.

Therefore, the present invention proposes a system that automatically generates a "scenario" showing what program-related information is to be presented in what order based on users' preference information and viewing status, and characteristics of information presented, and presents programmed program-related information (generates program-related contents) based on this scenario.

In general, a user interface structure is expressed in a tree structure, and the progress is expressed based on a change of the status on the nodes of the tree, structure. In the present invention the program-related contents generation/presentation apparatus first defines a tree structure of program-related contents, and determines presentation attributes of subordinate nodes of each sub-tree. When a specific event occurs on the program, program-related contents are generated, and a presentation yardstick that reflects users' preference information is calculated for leaves of the tree structure. Then, a status change route for presentation to each user is determined according to the calculated presentation yardstick and the presentation attributes of the relevant information. This status change route is called a "presentation scenario". Then, presentation scenarios are distributed to corresponding portable terminals. At each portable terminal, based on the presentation according to the presentation scenario, a user can passively view personalized information prepared for each user, on a limited display area of the portable terminal without a complex interaction. The user can view desired information in a desired order.

2) Schematic Structure of a Program-Related Contents Distribution System According to the Present Embodiment, FIG. 1 shows a schematic structure of a program-related contents distribution system according to the present embodiment. As shown in FIG. 1, this system is constructed of a broadcasting station 100 that transmits a program video consisting of a plurality of continuous frames, and program metadata, through a digital broadcasting wave, a program-related contents generation/presentation apparatus (a distribution server) 200 that receives the program video and the program metadata transmitted from the broadcasting station 100, and generates and distributes program-related contents and presentation scenarios, and portable terminals 300 on which users view the presentation scenarios distributed from the program-related contents generation/presentation apparatus 200.

Number is not particularly limited for each of the broadcasting station 100, the program-related contents generation/presentation apparatus 200, and the portable terminals 300. For the portable terminal 300, it is possible to use an apparatus that has a video transmitting and receiving function, and a display function, like a portable telephone, a notebook type computer, and a PDA (portable information terminal). It is also possible to use an apparatus that is a combination of an STB (set top box) that has been distributed recently and a display device.

The program-related contents generation/presentation apparatus 200 shows an example of when this apparatus receives program videos and program metadata from the broadcasting station 100. The operation that this apparatus directly inputs program videos and program metadata of a past broadcasting from a medium is basically the same as the above, and this operation is also included within the scope of the present invention.

3) Outline of a Program-Related Contents Transmission Service,

The outline of a program-related contents transmission service by the program-related contents generation/presentation apparatus 200 according to the present embodiment will be explained below. This service is one that enables a user to view desired information in a desired order according to the progress of a program (that is, a real-time program-related contents transmission service). This service has the following characteristics.

First, the system instantly transmits program-related contents when an important event has occurred in the program.

Second, a user of the service (the same as the user of the portable terminal 300) can assign a timing of receiving program-related contents, and a data quantity of the receiving program-related contents.

Third, the program-related contents reflect users' preferences, and kinds of information, a quantity of information, and an order of the program-related contents presented are different for each user.

Fourth, a user can passively view program-related contents as a program.

Figure 2:
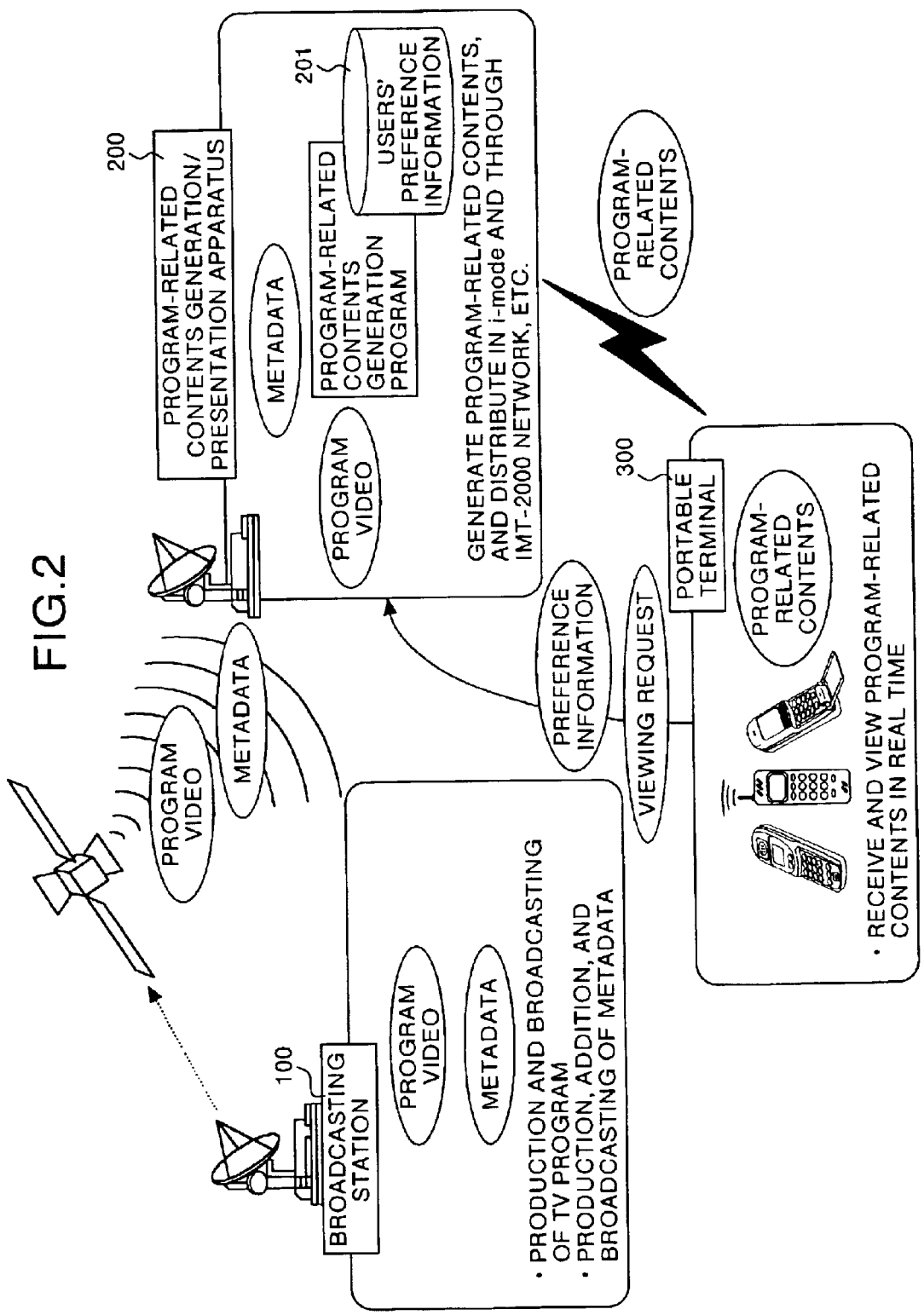
FIG. 2 is an outline diagram which shows a program-related contents transmission service according to the embodiment.

FIG. 2 is an outline diagram of the program-related contents transmission service. A user registers in advance own preference information to a database 201 of the program-related contents generation/presentation apparatus 200. This preference information has a structure that can be registered to the program-related contents generation/presentation apparatus 200 by using a data transmission function of the portable terminal 300. The broadcasting station 100 transmits program metadata together with a program video through a digital broadcasting wave.

In order for a user to start viewing program-related contents, the user first transmits a "viewing request" from the portable terminal 300 to the program-related contents generation/presentation apparatus (distribution server) 200. When an important event has occurred in the program, a program within the program-related contents generation/presentation apparatus 200 decides whether program-related contents should be transmitted to individual users or not.

When the program has decided that program-related contents should be transmitted to individual users, the program instantly reflects a user's preference, prepares personalized program-related contents, and transmits the program-related contents to the user's terminal by mail via the i-mode or the IMT 2000 network. Based on this service, the user can view desired program-related contents, and can know the progress of the program substantially in real time.

Screen images when a user views the generated program-related contents on the portable terminal 300 will be explained with reference to FIG. 3. This shows an example that program-related contents are generated from a baseball program (program video). Immediately after Yoshi Takahashi of Giant hit a come-from-behind two-run home run, the system generates program-related contents as a one-minute program for Yoshi Takahashi fans.

First, "contents explanation" of the two-run home run of Yoshi Takahashi player is shown. Next, "scores", "today's turns at bat", "a word before the game", "record in this season", and "digest" of Yoshi Takahashi are shown. When a program is to be generated for Hiroshima fans, presentation of information should be focused on Hiroshima. For example, the Yoshi Takahashils homerun scene is shown first, and "today's pitching" of Hiroshima's Kuroda pitcher, and "digest" of Hiroshima first scoring scene will be shown. In the present embodiment, a motion picture is presented for five seconds to ten seconds depending on the importance level, and a text is presented for three seconds to ten seconds depending on the quantity of information. According to the program-related contents transmission service of the present embodiment, these scenes are automatically developed on the portable terminal 300.

Figure 3:
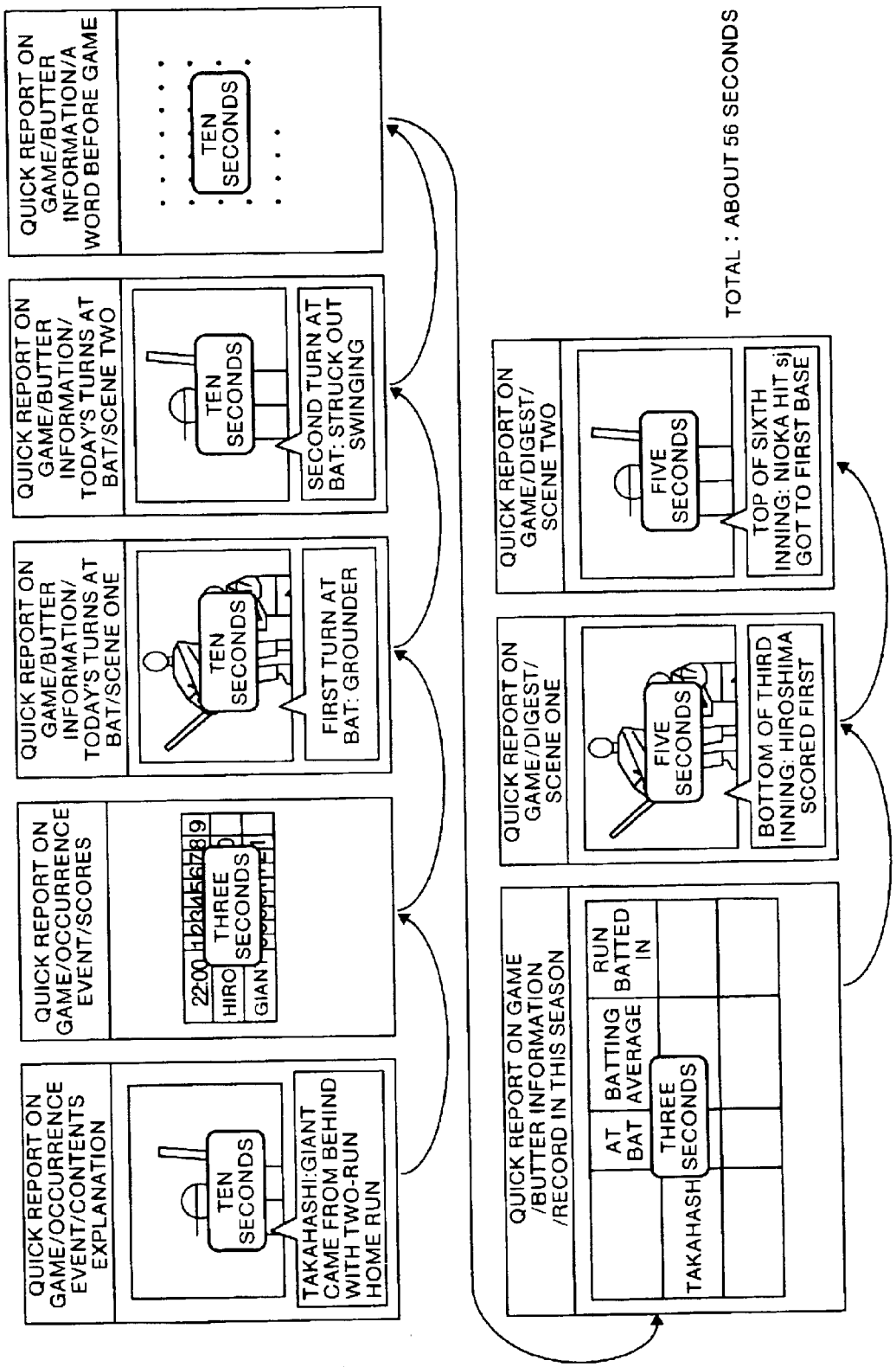
FIG. 3 is an explanatory diagram which shows screen images when a user views program-related contents generated according to the present embodiment.
Figure 4:
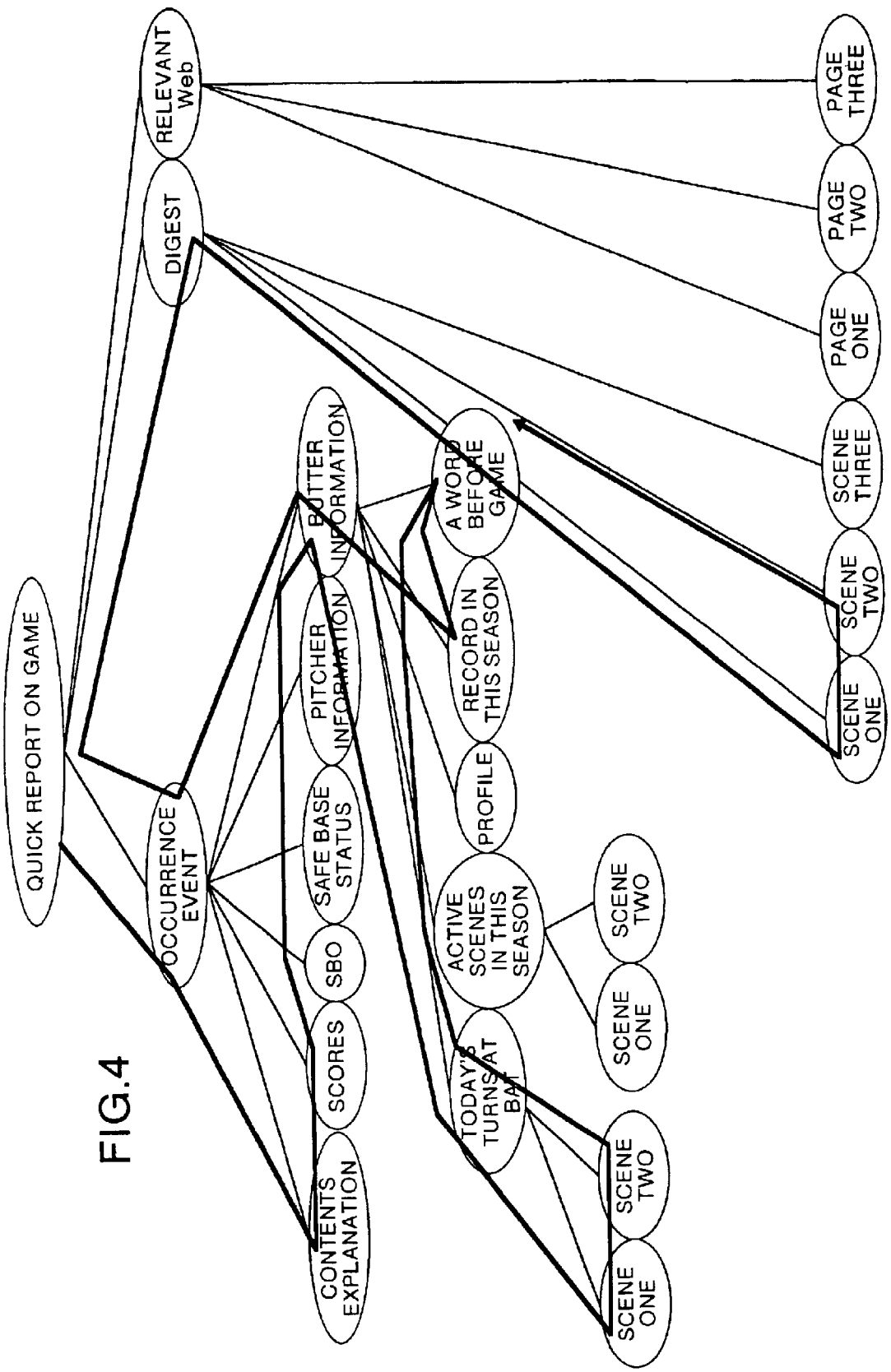
FIG. 4 is an explanatory diagram which shows a presentation scenario in a program-related contents generation/presentation method according to the present embodiment.
Figure 10:
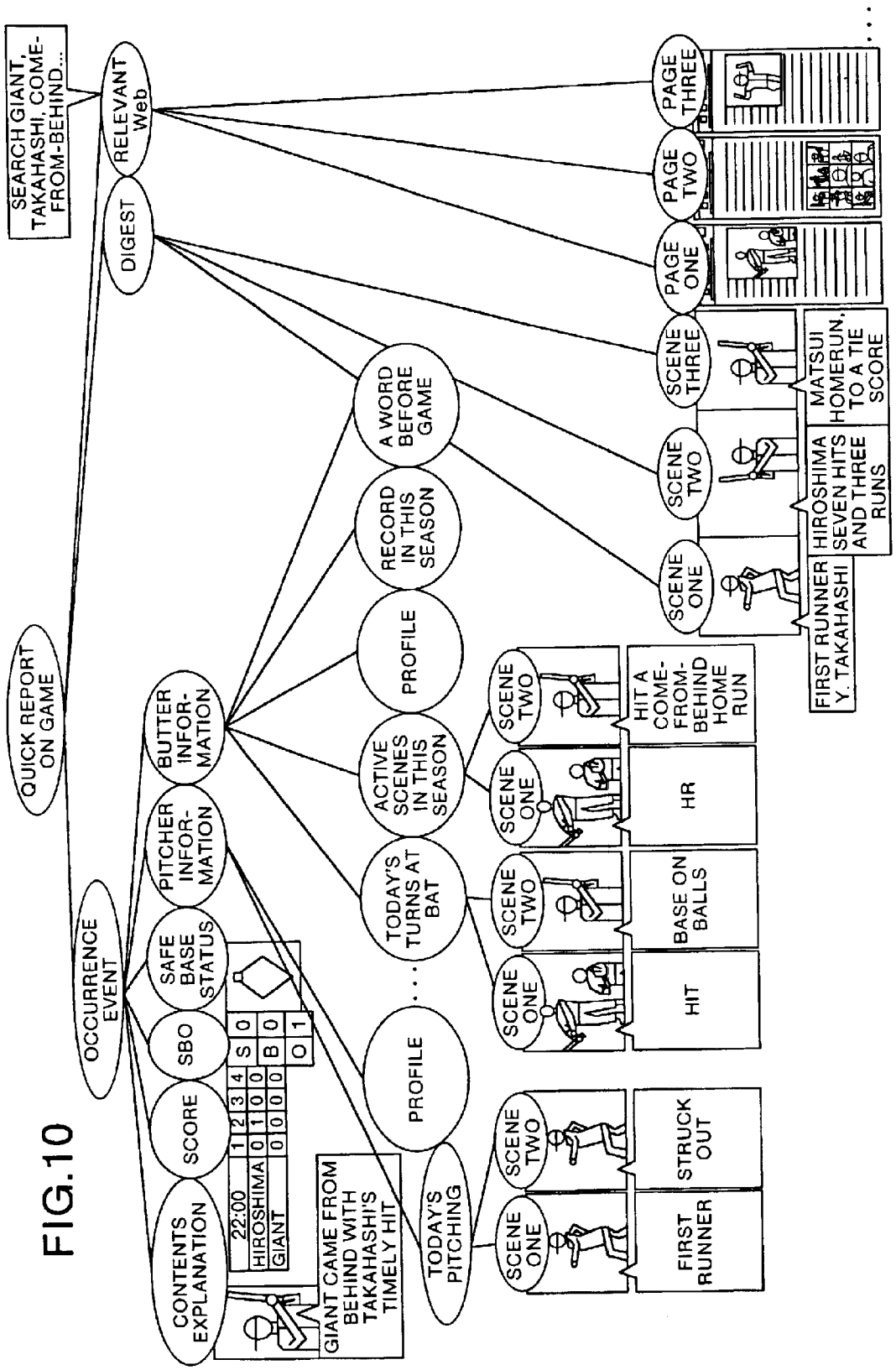
FIG. 10 is an explanatory diagram which shows a tree structure of program-related contents.

4) Program-Related Contents Presentation Scenario Generation Processing,

FIG. 4 shows a trace of the tree structure shown in FIG. 10 at the time of generating program-related contents shown in FIG. 3. This route is for the fans of Takahashi player of Giant. When a program is to be prepared for the fans of Hiroshima, the route becomes different from this route. In other words, in order to realize the above service, it is necessary to have a function that can automatically extract information that a user wants to view from the tree structure of the program-related contents, and present this information in the order that the user wants to view. In order to realize this function, the present embodiment proposes a program-related contents "presentation method according to a scenario (the program-related contents generation/presentation method of the present invention)". The "presentation scenario" is a presentation route in the tree structure of the program-related contents as shown in FIG. 4.

In FIG. 4, a presentation scenario is generated in the order of a root node "quick report on the game" as a starting point, to a leaf node "contents explanation" a leaf node "scores", a leaf node "pitcher information", a leaf node "today's turns at bat, scene one", a leaf node "today's turns at bat, scene two", a leaf node "a word before the game", a leaf node "record in this season", a leaf node "digest, scene one", a leaf node "digest, scene two", etc.

The program-related contents generation/presentation method of the present embodiment consists of the following seven processing steps from (1) to (7).

Figure 5:
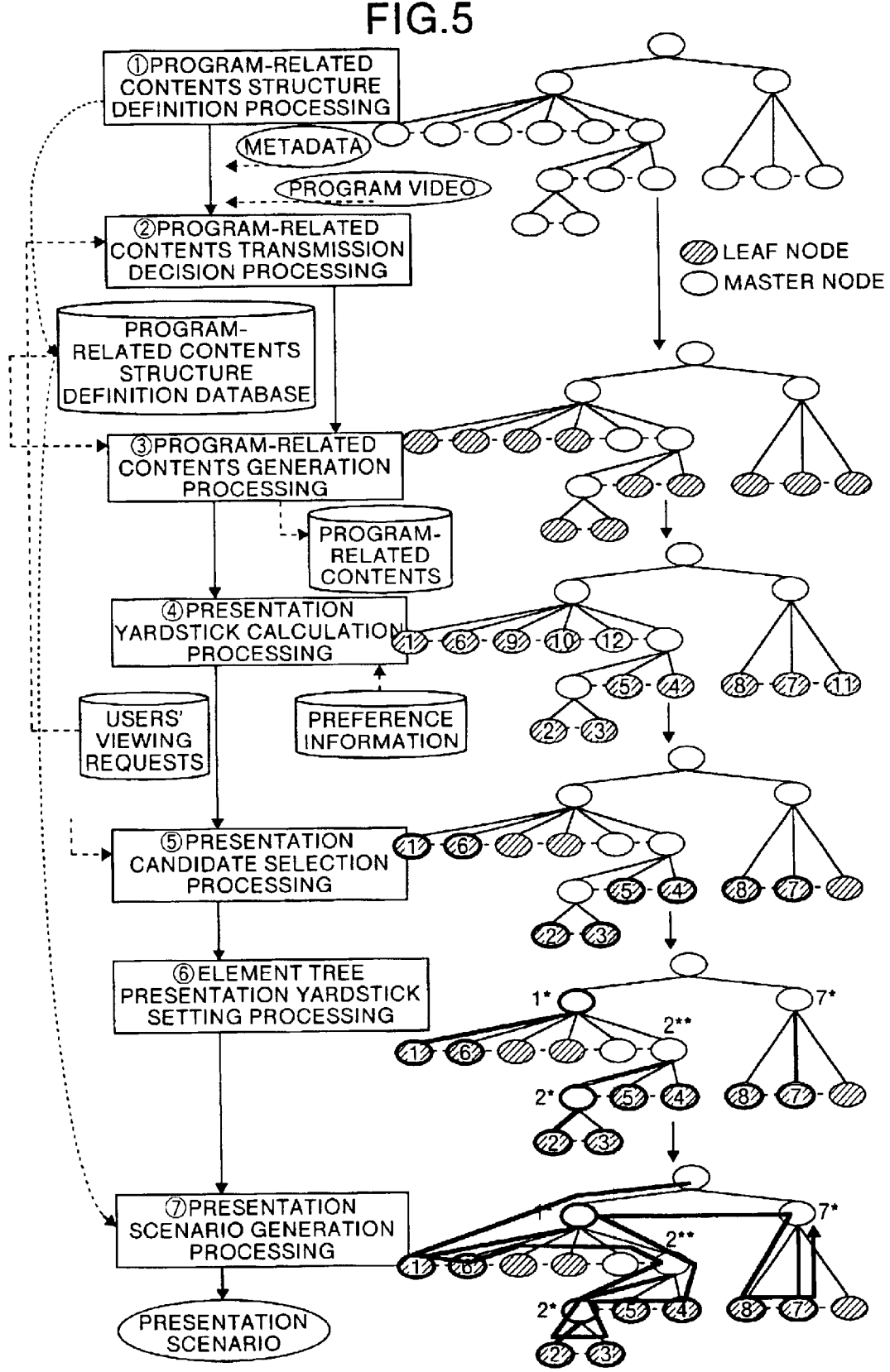
FIG. 5 is a flowchart which shows a status that a presentation scenario of program-related contents is generated according to the present embodiment.

(1) Program-related contents structure definition processing (2) Program-related contents transmission decision processing (3) Program-related contents generation processing (4) Presentation yardstick calculation processing by reflecting user's preference (5) Presentation candidate selection processing (6) Element tree presentation yardstick setting processing (7) Presentation scenario generation processing FIG. 5 shows a status that a presentation scenario of program-related contents is generated for individual users at the above seven processing steps. The processing seven steps will be explained in detail below based on an example of generating a presentation scenario of FIG. 4 from the tree structure shown in FIG. 10.

5) Program-Related Contents Structure Definition Processing,

At the (1) program-related contents structure definition processing step, a tree structure of program-related contents is defined first.

Figure 6A:
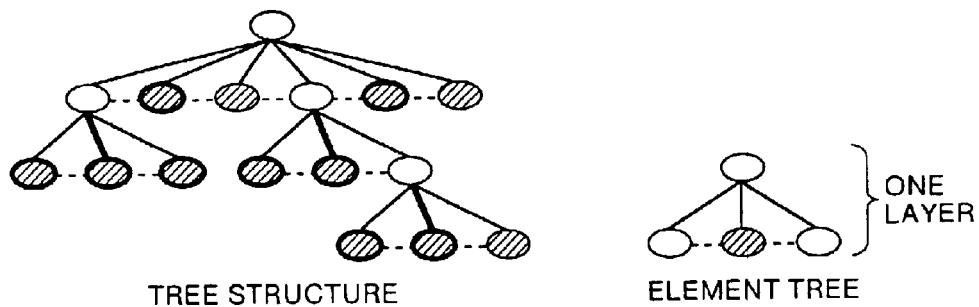
FIG. 6A through FIG. 6C are explanatory diagrams which show a tree structure and presentation attributes of program-related contents.

In general, it is possible to express a tree structure as a composite of one-layer sub-trees, as shown in FIG. 6A. This one-layer sub-tree will be called here as an "element tree". Subordinate nodes of an element tree include both nodes that become master nodes of the next element tree under this element tree, and leaf nodes.

An attribute (presentation attribute) that shows an order of presenting subordinate nodes is set to this element tree as follows.

Presentation attribute, in_order_of (<attribute name>|presentation yardstick)
{ascendant|descendant}

Figure 6B:
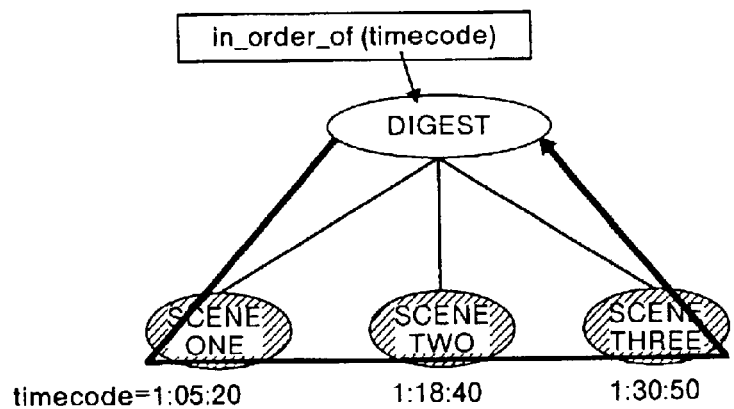

The above in_order_of (<attribute name>) shows that subordinate nodes are presented in the ascending order (or the descending order, in the ascending order when this indication is omitted) of values of the assigned attributes. In an example shown in FIG. 6B, in_order_of (timecode) is assigned to a sub-tree "digest (digest of a program video)", as scenes of the subordinate nodes should be presented in time series (in the order of timecode).

Figure 6C:
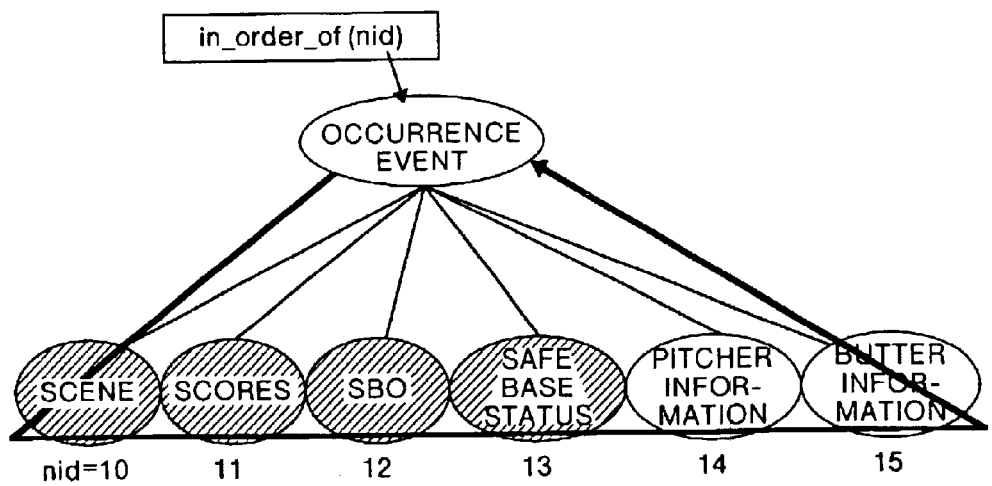

In an example shown in FIG. 6C, in_order_of (nid) is assigned to a sub-tree "occurrence event", as contents explanation, scores, and SBO should be presented in the order of respective node IDs. The above in_order_of (presentation yardstick) will be explained in detail later. Structure definitions of the program-related contents generated at the program-related contents structure definition processing step are stored in a program-related contents structure definition database as shown in FIG. 5.

As another example of a presentation yardstick, there are a number of accesses made to a Web page.

6) Program-Related Contents Transmission Decision Processing,

The (2) program-related contents transmission decision processing step will be explained. According to the progress of a program, a program video and metadata are transmitted from the broadcasting station 100. At the program-related contents transmission decision processing step, when an event has occurred in the program, it is decided whether program-related contents should be transmitted to individual users or not.

Assume that a user has assigned in advance a timing of receiving program-related contents as the following viewing request.

Receive information each time when a score has been added

Receive information each time when the inning ends

Receive information each time when an important event (for the user) has occurred When an event has occurred in the program, at the program-related contents transmission decision processing step, it is decided whether program-related contents should be transmitted or not based on the viewing request and the information of the occurrence event. For example, when "Receive information each time when a score has been added" has been stored as the viewing request, it is decided that the program-related contents should be transmitted when the contents of the occurrence event is "addition of score". When "Receive information each time when an event important has occurred (important event, Takahashi's turns at bat)" has been stored as the viewing request, it is decided that the program-related contents should be transmitted when the contents of the occurrence event is "turn at bat, Takahashi".

Depending on information, some information should be transmitted to certain users, but this information should not be transmitted to other users. In the present embodiment, viewing request has been stored for each user in advance. Therefore, it is possible to decide for each user whether program-related contents should be transmitted or not. When there is at least one person to whom the information should be transmitted, the process proceeds to the next (3) program-related contents generation processing step.

7) Program-Related Contents Generation Processing,

The (3) program-related contents generation processing step will be explained. First, as a conventional technique, there has been already known a system for automatically preparing event drive type program-related information that utilizes program metadata ("Shirota", An Event Drive type Data Broadcasting Program-Related Information Preparation System). The "event" refers to event information of an event that occurred in the program.

In the (3) program-related contents generation processing of the present embodiment, program-related contents are generated based on the occurrence event by using the technique known in "Shirota". Program-related contents are generated based on the tree structure of the contents. For example, in the tree structure shown in FIG. 10, contents explanation, pitcher information on the occurrence event, batter information, scores, and getting-on-base information are generated for nodes of the occurrence event.

These data are updated each time when an event occurs, and the latest information is always held in the program-related contents database. On the other hand, digest scenes and relevant Web pages are data that are generated according to the progress of a game and are accumulated in the program-related contents database. Users want to view always the latest information regarding the occurrence events, and the information accumulated according to the progress of a game from its start regarding the digest and the relevant Web.

8) Presentation Yardstick Calculation Processing,

At the (4) presentation yardstick calculation processing step, individual users' presentation yardsticks are calculated for the program-related contents that have been prepared in the (3) program-related contents generation processing. A presentation yardstick is calculated based on the following characteristics that are added to each leaf node of the tree structure of the program-related contents.

F, Freshness. This is a characteristic that represents freshness of information. When the information becomes old, the value of this information becomes lower. The freshness is a yardstick for filtering the information of time-series data that has been proposed by Uma and others in the literature of "Uma". When an average time distance between certain information A and a set of similar information ω is larger, the freshness of the information A is considered larger, and the freshness of the information A based on the time distance between the information A and the set of similar information ω is defined as follows.

[Expression 1]

$$\text{Freshness}(A, \omega) = \log\left(\frac{1}{m}\sum_{i=1, Bi \in \omega}^{m}(t(A) - t(bi))\right) \quad (1)$$

where t (A) represents an updating time of the information A, m represents a number of articles of ω, and $b_i$ represents each similar information of ω.

S, Significance. This is a characteristic that represents significance of information. The significance is a value obtained according to a status parameter calculation technique that reflects users' preferences in generating a digest that has been proposed in the literature of "Hashi 01".

U, Unexpectedness. This is a characteristic of which value increases when the information of a leaf node has had unexpected contents. A weight Wi is set to each characteristic. Based on these characteristics and weights, a presentation parameter (presentation_param) of each leaf node of the program-related contents is calculated as a weighted average of the characteristics.

[Expression 2]

$$\text{presentation\_param}(nid) \sum_{i=F,S,U} Wi(nid) \times param_i(nid) \quad (2)$$

where nid represents an ID of a leaf, and Wi (nid) represents a function that reflects the weight of a characteristic shown by the index i in this leaf node. $Param_i$ (nid) represents a value in the leaf node of the characteristic shown by the index i. This value becomes 0 when an assigned characteristic has not been added. As users' preference information is reflected in the significance S, this presentation parameter also reflects the users' preference as a result.

Leaf nodes are sorted based on the calculated values of presentation parameters. The orders of the sorted result become the "presentation yardsticks" of these leaf nodes.

9) Presentation Candidate Selection Processing,

At the (5) presentation candidate selection processing step, a candidate of information to be presented is selected according to individual users' requests. A user makes the following requests regarding the quantity of information that the user receives at the portable terminal 300.

Want to view during a period of one minute

Want to view only important information

When the user has assigned "Want to view during a period of one minute", leaf nodes that can present information during a period of one minute are selected as presentation candidates according to the presentation yardsticks of the leaf nodes at the presentation candidate selection processing step.

10) Element Tree Presentation Yardstick Setting Processing,

At the (6) element tree presentation yardstick setting processing, a presentation yardstick of a master node of an element tree to which leaf nodes of the presentation candidates belong is obtained. The presentation yardstick of a master node becomes a maximum value among presentation yardsticks of subordinate nodes that belong to this element tree. A presentation yardstick of this master node is obtained in a similar manner, and presentation yardsticks are set, up to the subordinate nodes one layer below the route. In FIG. 5, a presentation yardstick of a master node is shown as "2*".

Figure 7:
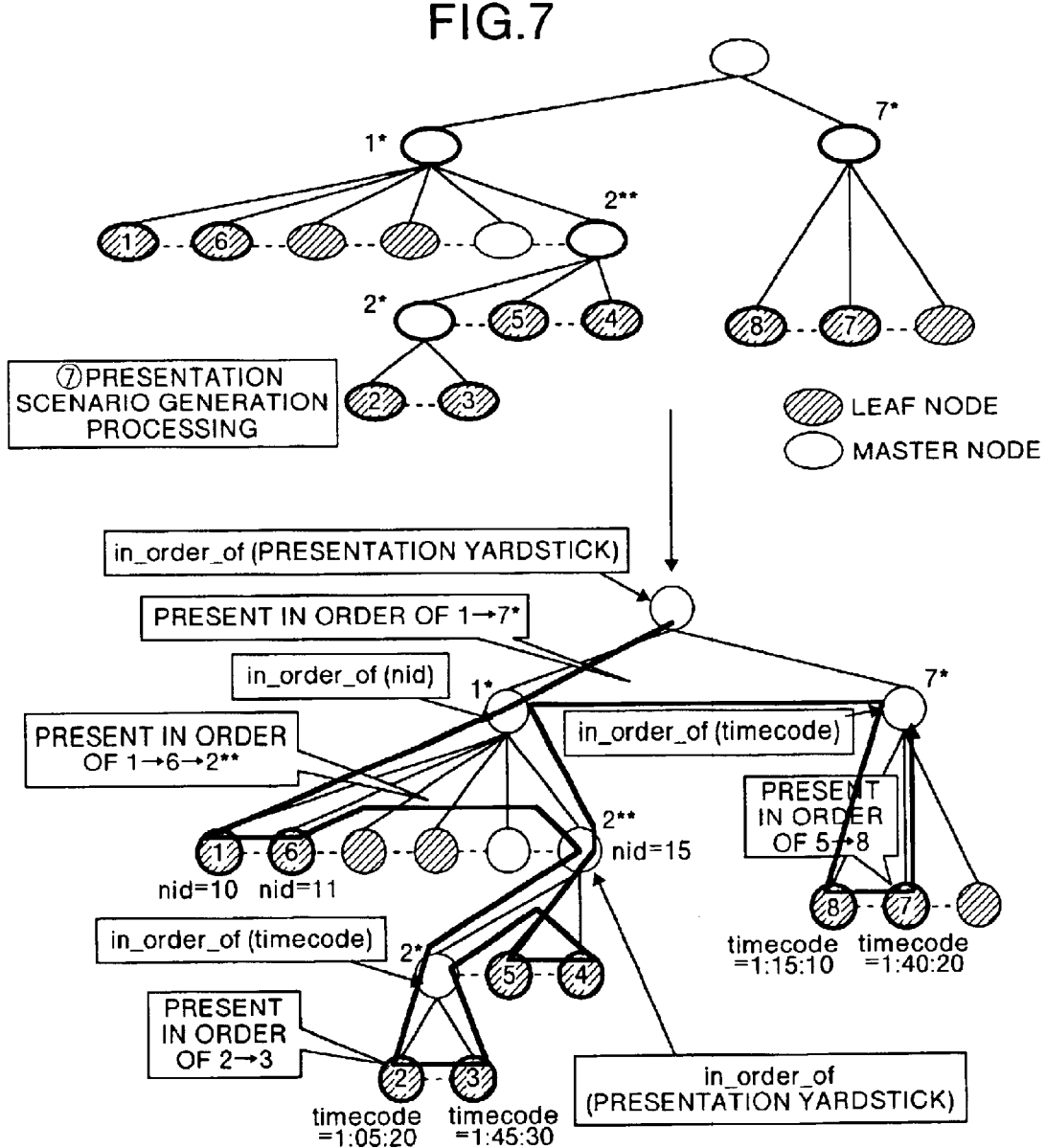
FIG. 7 is an explanatory diagram which shows details of a presentation scenario generation processing step.

11) Presentation Scenario Generation Processing,

At the (7) presentation scenario generation processing step, a presentation scenario is generated based on presentation yardsticks obtained so far. FIG. 7 is an explanatory diagram which shows details of the presentation scenario generation processing step. A tree structure shown in FIG. 7 is an extract from FIG. 10, and a root node is "quick report on the game". Other nodes are related as shown in Table 1. In Table 1, presentation yardsticks are expressed as 1*, 1, 2**, 2* . . . 7, 8 to show relative orders. However, the expression of the presentation yardsticks is not limited to this way, and it is needless to mention that they may be expressed using actually calculated numerical values (absolute values).

TABLE 1

| Presentation yardstick | Node name |
|---|---|
| 1* | Game start/occurrence event |
| 1 | Game start/occurrence event/contents explanation |
| 2** | Game start/occurrence event/butter information |
| 2* | Game start/occurrence event/butter information/today's turns at bat |
| 2 | Game start/occurrence event/butter information/today's turns at bat/scene 1 |
| 3 | Game start/occurrence event/butter information/today's turns at bat/scene 2 |
| 4 | Game start/occurrence event/butter information/a word before the game |
| 5 | Game start/occurrence event/butter information/record in this season |
| 6 | Occurrence event/scores |
| 7* | Game start/digest |
| 7 | Game start/digest/scene 1 |
| 8 | Game start/digest/scene 2 |

A determination processing of a presentation scenario is started from the route node "quick report on the game". The presentation attribute of the root node is in_order_of (presentation yardstick). This indicates that the nodes that are one layer below the root node are traced in the order of the presentation yardsticks. The presentation yardsticks of the nodes are 1* ("occurrence event") and 7* ("digest"). Therefore, the tree of the "occurrence event" is traced first.

The presentation attribute of the "occurrence event" is in_order-of (nid). Therefore, the nodes of the presentation candidates (presentation yardsticks 1, 6, 2**) are traced in the order of nid, as the "contents explanation", the "scores", and the "butter information". The presentation attribute of the "today's turns at bat" (the presentation yardstick 2*) below the "butter information" (the presentation yardstick 2) is in_order_of (timecode). Therefore, the nodes of the presentation candidates are presented in the order of the timecode. This processing is carried out recursively until when all leaves that have been selected as presentation candidates are traced. Then, a presentation scenario is generated. Based on this processing, a presentation scenario for presenting the program shown in FIG. 4** is generated.

A presentation scenario generated for each user by this presentation scenario generation processing is transmitted to a portable terminal of the corresponding user as an html file, of which detailed explanation will be omitted. This transmission processing uses a function (mail transmission) as a distribution server of the program-related contents generation/presentation apparatus 200.

12) Program-Related Contents Generation/Presentation Apparatus,

The program-related contents generation/presentation apparatus 200 operates as a distribution server of program-related contents on the Windows 2000 machine (pentium III 600 MHz), for example.

Figure 8:
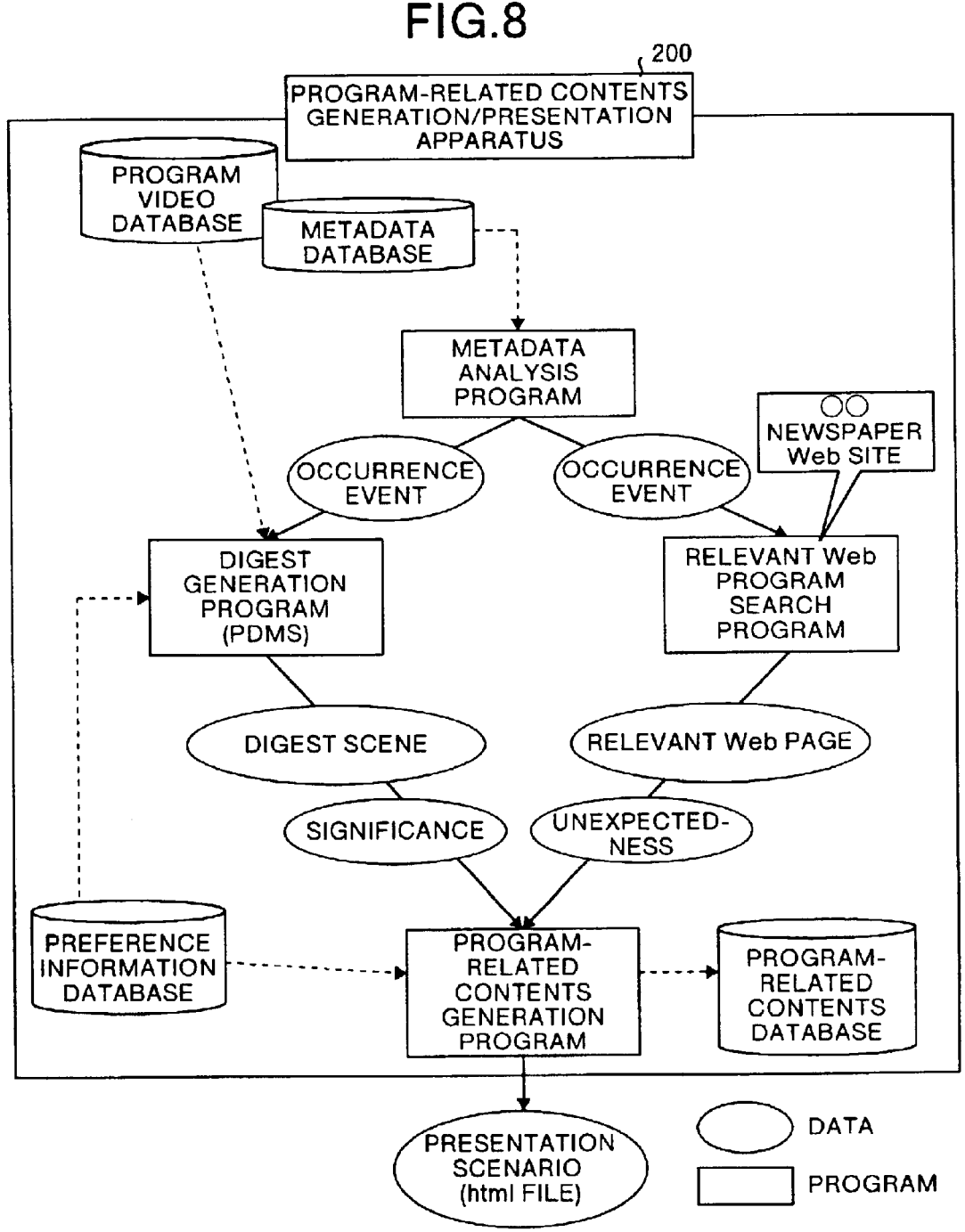
FIG. 8 is a block structure diagram of a program-related contents generation/presentation apparatus.

FIG. 8 is a block structure diagram of the program-related contents generation/presentation apparatus 200. The present apparatus 200 is constructed of four programs (a metadata analysis program, a digest generation program, a relevant Web search program, and a program-related contents generation program) and four databases (a program video database, a metadata database, a preference information database, and a program-related contents database).

The digest generation program utilizes a digest generation PDMS system of a known technique that has been proposed in "Hashi 01". Assume that a metadata file of a baseball program is prepared in advance, and this metadata file has been accumulated in the database together with a program video. The digest generation program calculates the significance of the occurrence event itself and the significance of the digest scene.

The metadata analysis program reads metadata in real time from the file according to a timecode, and issues information of the occurrence event to the digest generation program and the relevant Web search program.

The relevant Web search program searches for articles of the past two years of the ZZ Newspaper Publishing Company, for example, and calculates unexpectedness of each page. Specifically, this program categorizes pages of the searched result according to similarity, and increases the levels of unexpectedness of the pages that are included in the category other than professional baseball.

The program-related contents generation program is a program that executes the presentation scenario generation processing of the program-related contents in the present embodiment (the processing of the steps (1) to (7) in FIG. 5). In other words, the program-related contents generation program generates program-related contents, calculates freshness, and generates presentation scenarios for individual users, based on the significance of digest scenes generated by the digest generation program and each event, the Web pages searched for by the relevant Web search program, and the calculated unexpectedness.

Figure 9A:
FIG. 9A and FIG. 9B are explanatory diagrams which show display examples of screens of a portable terminal according to the present embodiment.
Figure 9B:
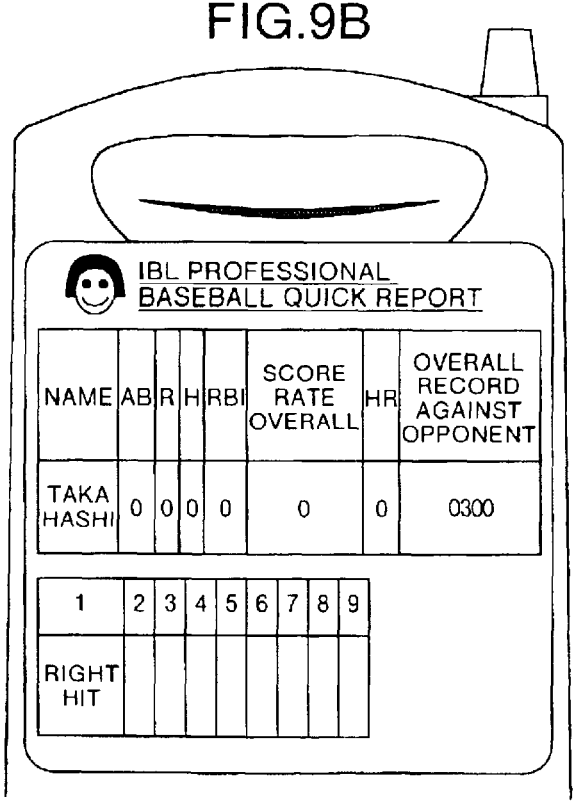

In the program-related contents generation/presentation apparatus 200, a presentation scenario is realized as an html page attached with only one link button. A mail attached with URL of this presentation scenario is transmitted to users. The users click this URL, and start viewing the program-related contents. The users depress a link button within each page to change statuses according to the presentation scenario. FIG. 9A and FIG. 9B show display examples of screens of the portable terminal 300.

As explained above, according to the present embodiment, a program video and program-related information are input, and program-related contents are generated based on a tree structure. Based on a viewing data quantity that has been set in advance as a viewing request from each user who has a portable terminal, leaf nodes in the tree structure of the program-related contents are selected as presentation candidates for each user. A presentation route that follows the leaf nodes of the presentation candidates starting from the root of the tree structure is generated as a presentation scenario for each user. The generated presentation scenario is transmitted to the portable terminal of the corresponding user. Therefore, users can passively view the information that has been personalized for each corresponding user in the limited display area of the portable terminal, without a complex interaction. Each user can view the information in a desired order of viewing the information.

As explained above, according to a program-related contents generation/presentation method of the present invention, a program video and program-related information are input, and program-related contents are generated based on a tree structure defined in advance. Based on a viewing data quantity that has been set in advance as a viewing request from each user who has a portable terminal, leaf nodes in a tree structure of the program-related contents are selected as presentation candidates for each user. A presentation route that follows the leaf nodes of the presentation candidates starting from the root of the tree structure is generated as a presentation scenario for each user. The generated presentation scenario is transmitted to the portable terminal of the corresponding user. Therefore, there is an effect that users can passively view the information that has been personalized for each corresponding user in the limited display area of the portable terminal, without a complex interaction. Each user can view the information in a desired order of viewing the information.

According to a method of and an apparatus for generation/presentation of program-related contents of the present invention, optional attributes are set as presentation attributes to sub-trees of a defined tree structure, and an ascending order or a descending order is set to the attributes, thereby to define how to trace subordinates nodes of the tree structure of program-related contents. A receiving timing of each user and an event that occurred in a program video are compared with each other, thereby to decide for each user whether the program-related contents should be generated and transmitted or not. When there exists a user to whom it has been decided that the program-related contents should be transmitted, the program video and program-related information are input, and the program-related contents are generated based on the defined tree structure. Presentation parameters are calculated for various information of leaf nodes in the tree structure of the generated program-related contents, by using significance that reflects users' preferences set in advance and freshness that shows levels of freshness of the information, and the leaf nodes are sorted based on the calculated values of the presentation parameters to obtain presentation yardsticks. Leaf nodes in the tree structure of the program-related contents are selected as presentation candidates for each user in the calculated order of the presentation yardsticks based on the viewing data quantity that has been set as a viewing request. A presentation yardstick of a master node of the selected presentation candidates is set to a maximum value among the presentation yardsticks of the subordinate nodes. A presentation route that follows the leaf nodes of the presentation candidates starting from the root of the tree structure based on how to trace the subordinates nodes is generated as a presentation scenario for each user. The generated presentation scenario is transmitted to the portable terminal of the corresponding user. Therefore, there is an effect that users can passively view the information that has been personalized for each corresponding user in the limited display area of the portable terminal, without a complex interaction. Each user can view the information in a desired order of viewing the information.

The present document incorporates by reference the entire contents of Japanese priority document, 2001-216039 filed in Japan on Jul. 16, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A program-related contents generation/presentation method of generating and presenting program-related contents to be distributed to a portable terminal from a program video and program-related information that is relevant to the program video along the progress of a broadcasting program, under a mobile environment of receiving text, still pictures or motion pictures by utilizing a portable terminal, the method comprising:

a definition step of defining a tree structure of the program-related contents, and setting optional attributes to sub-trees of the defined tree structure as presentation attributes, setting an ascending order or a descending order to the attributes, thereby to define how to trace subordinates nodes of the tree structure of program-related contents;

a transmission decision step of comparing a receiving timing of each user of the program-related contents assigned by each user having a portable terminal and an event that has occurred in the program video with each other, thereby to decide for each user whether the program-related contents should be generated and transmitted or not;

a program-related contents generation step of inputting the program video and program-related information, when there exists a user to whom it has been decided at the transmission decision step that the program-related contents should be generated and transmitted, and generating the program-related contents based on the tree structure defined at the definition step;

a presentation yardstick calculation step of calculating presentation parameters for various information of leaf nodes in the tree structure of the program-related contents generated at the program-related contents generation step, by using significance that reflects users' preferences set in advance and freshness that shows levels of freshness of the information, and sorting the leaf nodes based on the calculated values of the presentation parameters to obtain presentation yardsticks;

a presentation candidate selection step of selecting leaf nodes in the tree structure of the program-related contents as presentation candidates for each user in the order of the presentation yardsticks calculated at the presentation yardstick calculation step based on a viewing data quantity that has been set as a viewing request by each user in advance;

a master node presentation yardstick setting step of setting a presentation yardstick of a master node of the presentation candidates selected for each user at the presentation candidate selection step, to a maximum value among the presentation yardsticks of the subordinate nodes;

a presentation scenario generation step of generating a presentation route that follows the leaf nodes of the presentation candidates starting from the root of the tree structure based on how to trace the subordinates nodes, as a presentation scenario for each user; and a transmission step of transmitting the presentation scenario generated for each user at the presentation scenario generation step to the portable terminal of the corresponding user.

2. The method according to claim 1, wherein, in addition to the viewing data quantity, preference information like players and teams that each user likes, and the receiving timing that shows a desired timing of receiving program-related contents in a certain status of a program video, have been set as the viewing request in advance.

3. The method according to claim 1, wherein at the presentation candidate selection step leaf nodes to be selected as the presentation candidates are determined based on a reproduction time of a motion picture and a text display time that each leaf node has as attribute information, when the viewing data quantity has been assigned as a time like one minute or three minutes.

4. The method according to claim 1, wherein at the presentation scenario generation step generation of a presentation route is continued until when all leaf nodes that have been selected as presentation candidates at the presentation candidate selection step are traced.

5. A program-related contents generation/presentation apparatus that generates and presents program-related contents to be distributed to a portable terminal from a program video and program-related information that is relevant to the program video along the progress of a broadcasting program, under a mobile environment of receiving text, still pictures or motion pictures by utilizing a portable terminal, the apparatus comprising:

a definition unit that defines a tree structure of the program-related contents, and sets optional attributes to sub-trees of the defined tree structure as presentation attributes, sets an ascending order or a descending order to the attributes, thereby to define how to trace subordinates nodes of the tree structure of program-related contents;

a transmission decision unit that compares a receiving timing of each user of the program-related contents assigned by each user having a portable terminal and an event that has occurred in the program video with each other, thereby to decide for each user whether the program-related contents should be generated and transmitted or not;

a program-related contents generation unit that inputs the program video and program-related information, when there exists a user to whom it has been decided at the transmission decision unit that the program-related contents should be generated and transmitted, and generates the program-related contents based on the tree structure defined at the definition unit;

a presentation yardstick calculation unit that calculates presentation parameters for various information of leaf nodes in the tree structure of the program-related contents generated at the program-related contents generation unit, by using significance that reflects users' preferences set in advance and freshness that shows levels of freshness of the information, and sorts the leaf nodes based on the calculated values of the presentation parameters to obtain presentation yardsticks;

a presentation candidate selection unit that selects leaf nodes in the tree structure of the program-related contents as presentation candidates for each user in the order of the presentation yardsticks calculated at the presentation yardstick calculation unit based on a viewing data quantity that has been set as a viewing request by each user in advance;

a master node presentation yardstick setting unit that sets a presentation yardstick of a master node of the presentation candidates selected for each user at the presentation candidate selection unit, to a maximum value among the presentation yardsticks of the subordinate nodes;

a presentation scenario generation unit that generates a presentation route that follows the leaf nodes of the presentation candidates starting from the root of the tree structure based on how to trace the subordinates nodes, as a presentation scenario for each user; and a transmission unit that transmits the presentation scenario generated for each user at the presentation scenario generation unit to the portable terminal of the corresponding user.

6. The apparatus according to claim 5, wherein, in addition to the viewing data quantity, preference information like players and teams that each user likes, and the receiving timing that shows a desired timing of receiving program-related contents in a certain status of a program video, have been set as the viewing request in advance.

7. The apparatus according to claim 5, wherein the presentation candidate selection unit determines leaf nodes to be selected as the presentation candidates, based on a reproduction time of a motion picture and a text display time that each leaf node has as attribute information, when the viewing data quantity has been assigned as a time like one minute or three minutes.

8. The apparatus according to claim 5, wherein the presentation scenario generation unit continues to generate a presentation route until when all leaf nodes that have been selected as presentation candidates at the presentation candidate selection unit are traced.

* * * * *